April 12, 1966     O. FASSBINDER     3,245,328
EXPANSION JOINT FOR ROAD COVERING STRUCTURES
Filed July 5, 1962     6 Sheets-Sheet 1
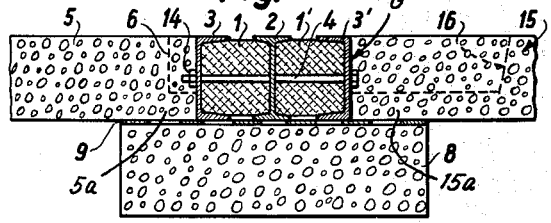
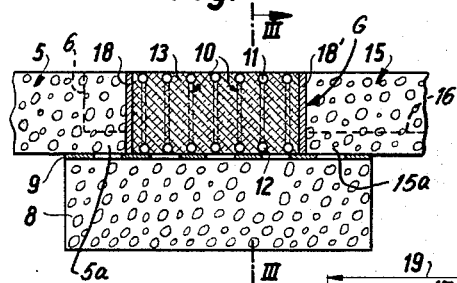
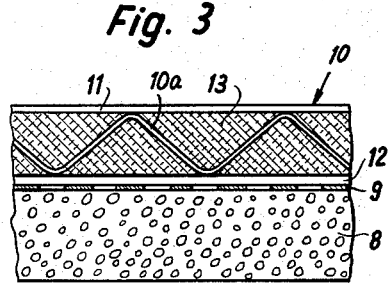
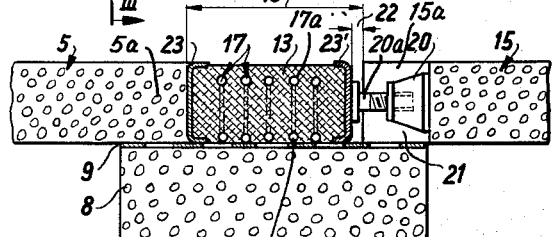
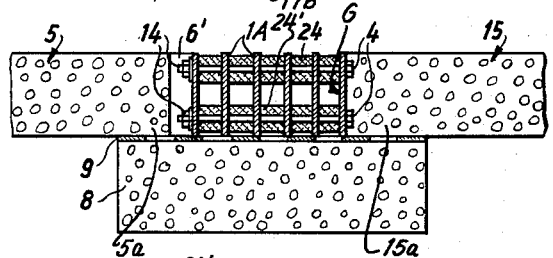
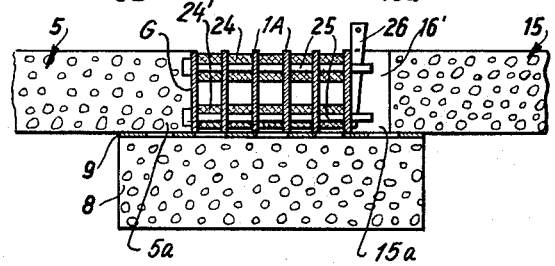
Inventor:
Otto Fassbinder
by: Michael J. Striker
his Attorney April 12, 1966   O. FASSBINDER   3,245,328
EXPANSION JOINT FOR ROAD COVERING STRUCTURES
Filed July 5, 1962   6 Sheets-Sheet 2

Inventor:
Otto Fassbinder
by: Michael S. Striker
his Attorney

April 12, 1966   O. FASSBINDER   3,245,328
EXPANSION JOINT FOR ROAD COVERING STRUCTURES
Filed July 5, 1962   6 Sheets-Sheet 3
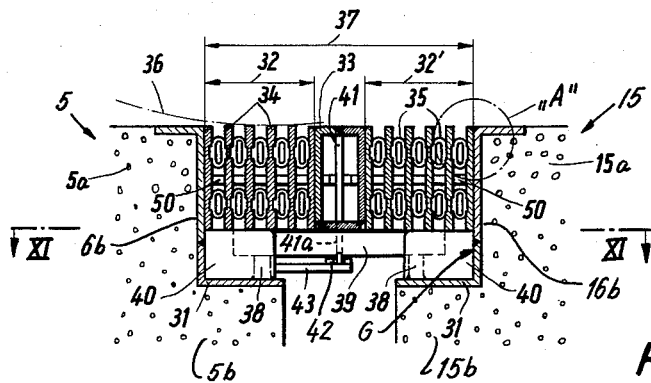
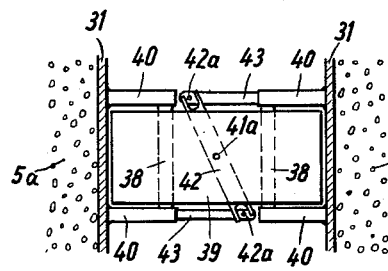
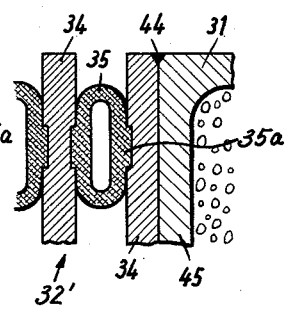
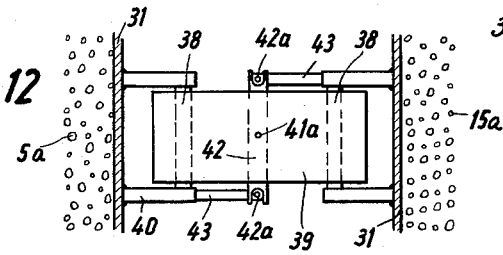
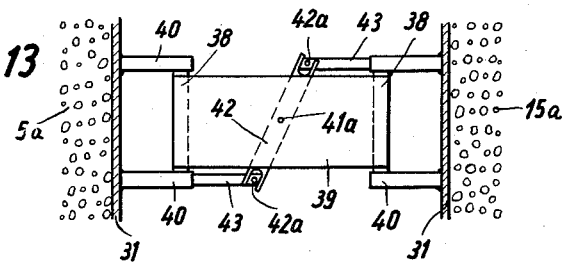
Inventor:
Otto Fassbinder
by:
Michael S. Striker
his Attorney April 12, 1966  O. FASSBINDER  3,245,328
EXPANSION JOINT FOR ROAD COVERING STRUCTURES
Filed July 5, 1962  6 Sheets-Sheet 4

Inventor:
Otto Fassbinder
by:
Michael S. Striker
his attorney

April 12, 1966     O. FASSBINDER     3,245,328
EXPANSION JOINT FOR ROAD COVERING STRUCTURES
Filed July 5, 1962     6 Sheets-Sheet 5
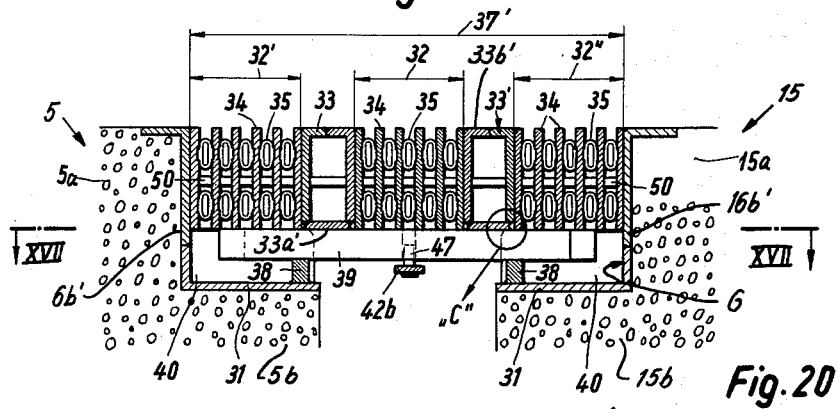
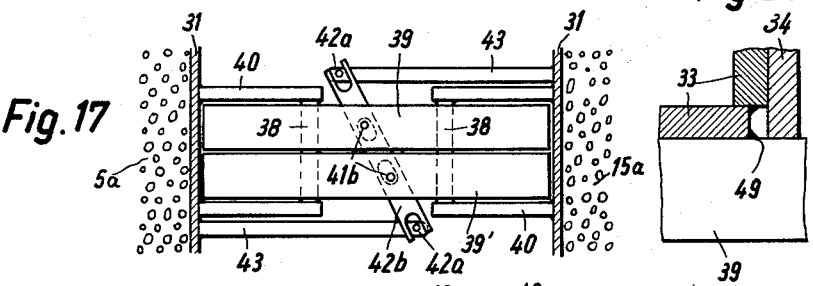
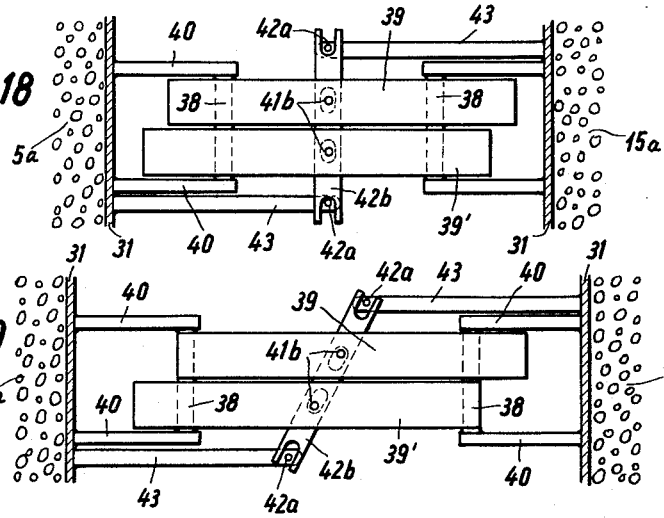
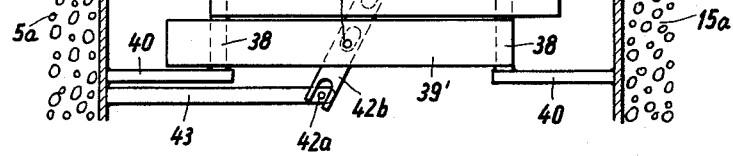
Inventor:
Otto Fassbinder
by: Michael S. Striker
his Attorney

United States Patent Office 3,245,328
Patented Apr. 12, 1966

3,245,328
EXPANSION JOINT FOR ROAD COVERING STRUCTURES
Otto Fassbinder, Dortmund-Berghofen, Germany, assignor to Rheinstahl Union Brueckenbau Aktiengesellschaft, Dortmund, Germany
Filed July 5, 1962, Ser. No. 207,489
Claims priority, application Germany, July 6, 1961, R 30,690
21 Claims. (Cl. 94—18)

The present invention relates to expansion joints for road covering structures, and more particularly to an improved expansion joint which is utilized for sealing the gaps between expansible and contractible or horizontally movable pavement sections. Still more particularly, the invention relates to an expansion joint which is especially suited for filling the gaps between relatively movable pavement sections which cover sidewalks for pedestrians, roadways for automotive vehicles, as well as zones of transition between an overpass or bridge and the road or sidewalk surface.

It is an important object of my invention to provide an improved air- and fluid-tight expansion joint between two pavement sections which are movable with respect to each other in response to temperature changes, and to assemble the joint in such a way that the gap between the pavement sections is properly filled and sealed irrespective of the width of the gap.

Another object of the invention is to provide a method of assembling and mounting an expansion joint of the above outlined characteristics.

A further object of the invention is to provide an expansion joint which is constructed and assembled in such a way that all of its parts are subjected to equal stresses regardless of the width of the gap in which the joint is received and regardless of the magnitude and nature of other stresses to which the joint may be subjected by vehicles, pedestrians or other loads which the joint supports in actual use.

An additional object of the invention is to provide a joint of the above outlined characteristics which may be rapidly and conveniently removed from the road covering structure if it becomes necessary to replace the entire or certain component parts of the joint.

Still another object of the invention is to provide an expansion joint whose component parts form one or more units and which is capable of satisfactorily filling gaps whose width exceeds and may even be a multiple of the length of contact between the tire of an automotive vehicle and the road covering structure.

A concomitant object of the invention is to provide an expansion joint which may be permanently embedded in a pair of adjacent pavement sections or which may be detachably retained between such sections without any danger that its parts would be expelled from the gap when the width of the gap is reduced in response to unexpectedly high rises in temperature.

A further object of the invention is to provide a method of and means for inserting an elastically compressible joint into a gap between two pavement sections.

Another object of the invention is to provide an expansion joint for use in road covering structures which consists of alternating elastic and rigid components and which is mounted between a pair of pavement sections in such a way that its elastic components are permanently compressed irrespective of the width of the crevice or gap between the pavement sections.

With the above objects in view, the invention resides in the provision of an expansion joint which is received in and which fills the gap formed by the edge portions of two relatively movable pavement sections consisting of concrete, metal or the like. The expansion joint preferably assumes the form of a grate consisting of elongated grate bars and elastically deformable cushions or packings which are interposed between the grate bars and, in accordance with my invention, the width of the joint in unstressed condition of its elastic parts exceeds the maximal width of the gap so that, once the joint is inserted into the gap, the elastic cushions remain under compression at all times and cooperate with the grate bars to form a tight seal between the pavement sections.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a fragmentary longitudinal vertical section through a road covering structure which includes an expansion joint embodying one form of my invention;

FIG. 2 is a similar fragmentary section through a road covering structure which embodies a modified expansion joint;

FIG. 3 is a fragmentary transverse section as seen in the direction of arrows from the line III—III of FIG. 2;

FIG. 4 is a fragmentary longitudinal vertical section through two pavement sections of a road covering structure and a transverse vertical section through a further expansion joint which latter is shown in a position it assumes during insertion into a gap defined by the pavement sections;

FIG. 5 is a similar section through a road covering structure, showing a different expansion joint prior to its permanent anchoring to the pavement sections;

FIG. 6 illustrates the road covering structure of FIG. 5 embodying another expansion joint which is shown in transverse vertical section and in a position it assumes prior to anchoring to the pavement sections;

FIG. 10 is a fragmentary longitudinal section through two pavement sections and a transverse section through a different expansion joint which comprises a centrally located spacer member and two elastically compressible packages which are disposed at the opposite sides of the spacer member;

Figure 22:
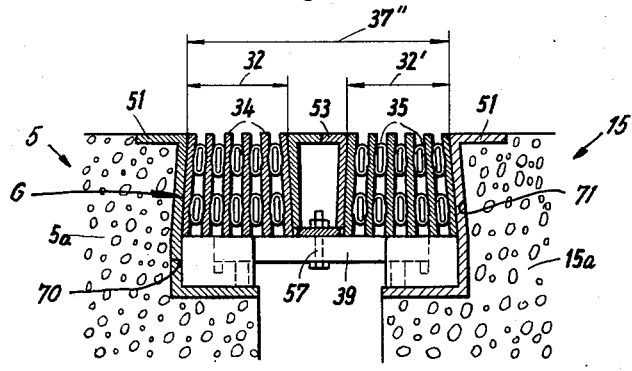
Figure 23:
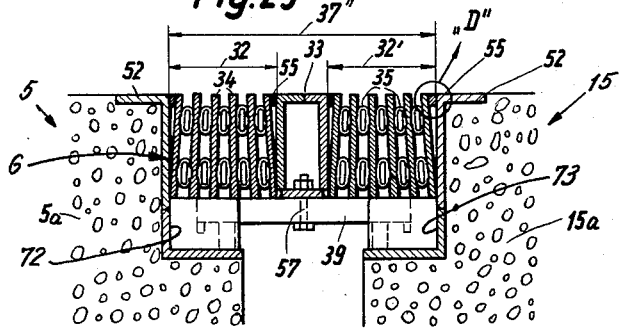
Figure 15:
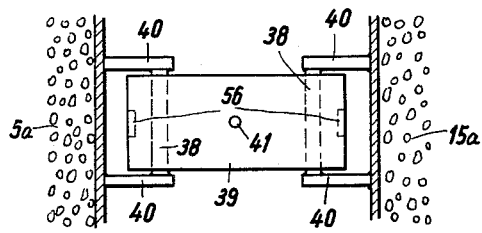
Figure 24:
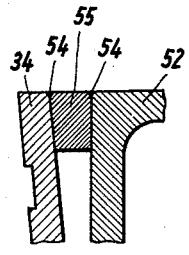
Figure 21:
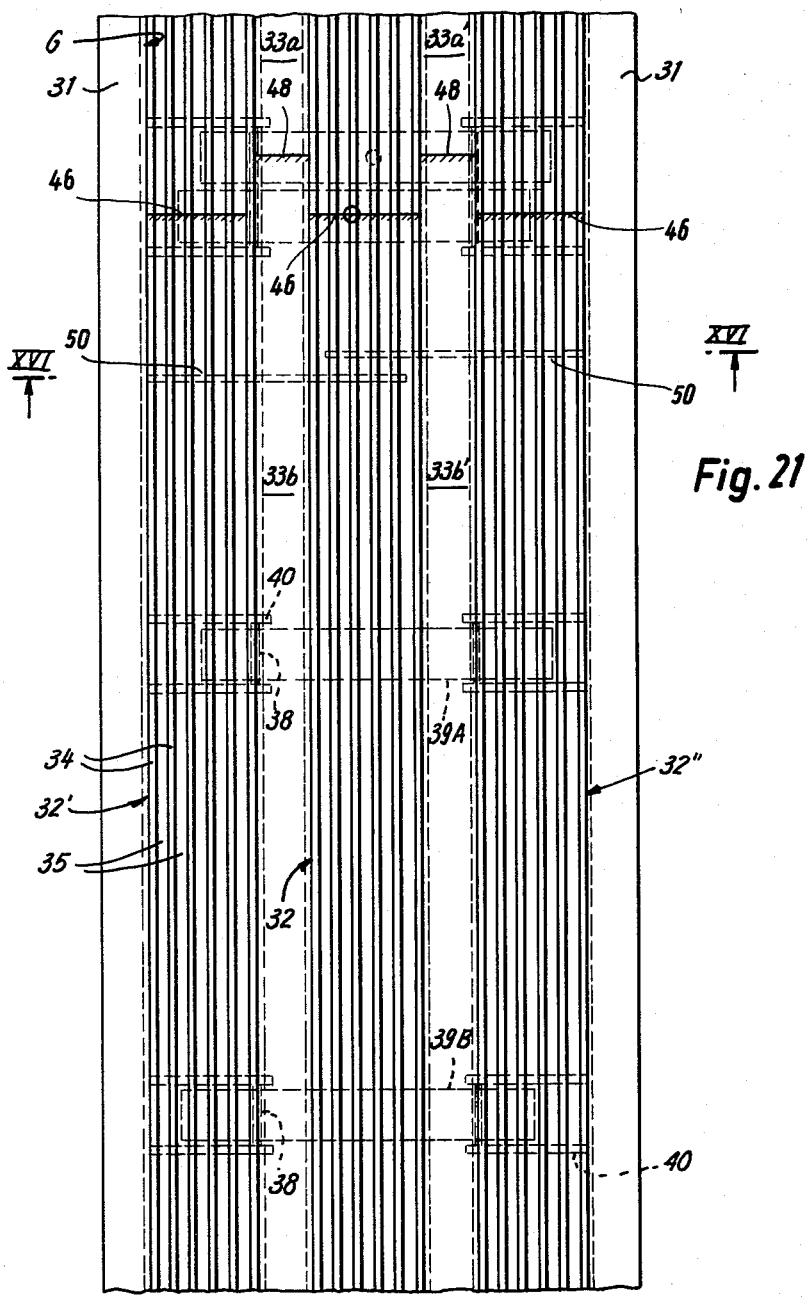

FIG. 11 is a horizontal section as seen in the direction of arrows from the line XI—XI of FIG. 10, showing an arrangement which serves as a means for centering the spacer member between the edge portions of the pavement sections, the spacer member and the packages of the expansion joint having been omitted for the sake of clarity and the centering means being shown in a position its parts assume when the width of the gap defined by the pavement sections is reduced to a minimal magnitude;

FIG. 12 illustrates the structure of FIG. 11 in a position the parts of the centering means assumed when the width of the gap increases;

FIG. 13 illustrates the structure of FIGS. 11 and 12 in a position the parts of the centering means assume at the time when the width of the gap attains its maximal magnitude;

FIG. 14 is a greatly enlarged detail sectional view of the structure shown within the circle "A" in FIG. 10;

FIG. 15 is a top plan view of different centering means which may be utilized in the construction of FIG. 10;

FIG. 16 is a longitudinal vertical section through two pavement sections and a transverse vertical section through a modified expansion joint which comprises two spacer members and three elastically compressible packages, the section of FIG. 16 being taken in the direction of arrows from the line XVI—XVI of FIG. 21;

FIG. 17 is a horizontal section as seen from the line XVII—XVII of FIG. 16, showing the centering means for the spacer members in a position such centering means assumes when the width of the gap between the pavement sections of the road covering structure is reduced to a minimum;

FIG. 18 illustrates the centering means of FIG. 17 in a position its parts assume at the time the width of the gap increases;

FIG. 19 illustrates the centering means of FIGS. 17 and 18 in a position its parts assume at the time when the width of the gap attains its maximal magnitude;

FIG. 20 is a greatly enlarged detail sectional view of the structure within the circle "C" in FIG. 16;

FIG. 21 is a top plan view of the structure shown in FIG. 16;

FIG. 22 is a longitudinal section through two pavement sections and through a further expansion joint whose elastically compressible packages are wedged between a spacer member and the edge portions of the pavement sections;

FIG. 23 is a similar section through a pair of pavement sections and through a different expansion joint wherein the packages of the joint are wedged by specially configurated inserts which are welded to the pavement sections and to the spacer member; and FIG. 24 is a greatly enlarged sectional view of a detail shown within the circle "D" in FIG. 23.

Referring now in greater detail to the illustrated embodiments, and first to FIG. 1, there is shown a road covering structure or pavement including two panel or plate like pavement sections 5, 15 having adjacent but spaced edge portions 5a, 15a which extend substantially at right angles to the longitudinal direction of the pavement and which define between themselves a gap G of variable width. The pavement sections 5, 15 consist of concrete and will expand or contract in response to temperature changes so as to change the width of the gap G between a minimal and a maximal magnitude. As shown, the edge portions 5a, 15a overlap a concrete base or foundation 8 whose upper side is provided with a layer 9 of friction reducing material enabling the two pavement sections to move toward and away from each other without buckling.

In accordance with my invention, the gap G accommodates a specially constructed expansion joint which assumes the form of an elastically compressible grate-like structure and which is received between the edge portions 5a, 15a in such a way that it remains under permanent compression irrespective of the width of the gap G. The joint comprises a single grate bar 2 which assumes the form of an I-beam and which extends in the longitudinal direction of the gap G so that its upper flange is flush with the upper sides of the pavement sections 5, 15. The lower flange of this grate bar rests on the layer 9 which may consist of asphalt, plastic or metal and which is applied to the upper side of the base 8. The bar 2 is received between a pair of elastically deformable packings or cushions 1, 1', and the expansion joint further comprises a pair of side walls in the form of U-bars 3, 3' whose upper and lower flanges are respectively coplanar with the upper and lower flanges of the grate bar 2. The outer sides of the side walls 3, 3' respectively abut against the edge portions 5a, 15a and the width of the packings 1, 1' in undeformed condition thereof is selected in such a way that the width of the expansion joint exceeds the maximal width of the gap G, i.e., when the joint is inserted into this gap, the packings 1, 1' are always compressed to make sure that they abut against the web of the grate bar 2 as well as against the webs of the respective side walls.

Before the expansion joint is inserted into the gap G, the edge portions 5a, 15a are respectively formed with cutouts 6, 16 which extend downwardly from the upper sides of the respective pavement sections toward but short of the layer 9. The bar 2 and the side walls 3, 3' are provided with aligned holes or bores for elongated bolts 4 which are slidably received in such bores and whose heads abut against the outer side of the side wall 3'. The ends of these bolts project beyond the outer side of the side wall 3 to receive nuts 14 which are applied with such force that the width of the expansion joint is less than the width of the gap G at the time the joint is about to be inserted between the edge portions 5a, 15a. The joint is then placed onto the layer 9 in such a way that the heads of the bolts 4 extend into the cutout 16 and that the nuts 14 extend into the cutout 6. In the next step, the nuts 14 are removed to permit expansion of the joint whereby the outer sides of the side walls 3, 3' respectively bear against the edge portions 5a, 15a. The cutouts 6, 16 are then filled with concrete and, after the concrete sets, the expansion joint is permanently embedded between the pavement sections 5, 15 to form a smooth transition between the upper sides of these sections over which the vehicles or pedestrains may pass. As stated above, the width of the packings 1, 1' is selected in such a way that these packings remain under compression even if the width of the gap G attains its maximum magnitude such as may be caused by extremely cold weather or in response to exceptionally large shifting forces which tend to move one of the sections 5, 15 away from the other section or vice versa.

Of course, it is equally possible to remove the bolts 4 after the expansion joint is properly received in the gap G. FIG. 1 shows that the length of the cutout 16 is sufficient to permit withdrawal of the bolt 4 in a direction to the right so that the grate bar 2 is then prevented from moving upwardly solely by pressure of compressed packings 1, 1'. The lower flanges of the bar 2, and of the side walls 3, 3' are slidable along the friction reducing layer 9 whereby the bar 2 always remains substantially midway between the side walls 3, 3' regardless of the width of the gap G. It will be readily understood that the cutouts 6 and 16 may be filled with tar or with another filler material and that the pavement sections 5, 15 may consist of metallic plates or the like without in any way departing from the spirit of my invention.

The bolts 4 are removed whenever the expansion joint of my invention is not likely to be squeezed out of the gap G because, if the bolts are removed, it is much simpler to remove the joint from the gap, for example, when the upper flanges of the bar 2 and of the side walls 3, 3' are worn away, when the elasticity of the packings 1, 1' is gone, when the bar 2 is deformed by unexpectedly strong mechanical forces during collision of vehicles, or for any other reason.

In the embodiment of FIG. 1, the packings 1, 1' consist of foamed plastic material which is preferably bonded to the bar 2 and to the side walls 3, 3' so that the expansion joint forms an integral unit. An important advantage of such joints is that moisture cannot penetrate to the friction reducing layer 9 especially if the material which fills the cutouts 6, 16 is a fluidtight substance which is in sealing contact with the outer sides of the side walls 3 and 3'.

FIG. 2 illustrates a modified expansion joint wherein the grate bars 10 assume the form of lattice girders one of which is shown in greater detail in FIG. 3. The upper chord 11 of each girder 10 is flush with the upper sides of the pavement sections 5, 15 and the lower chord 12 of each girder rests on and is slidable along the friction reducing layer 9 in directions at right angles to the longitudinal extension of the gap G. The chords 11, 12 and the non-illustrated upright chords of each lattice girder form a frame for a latticework 10a which is shown in the form of an undulate wire but which may also assume the form of a mat including intersecting vertical and horizontal wires or rods. The side walls 18, 18' of the expansion joint shown in FIG. 2 consist of two metallic plates or strips which respectively abut against the edge portions 5a, 15a and which are retained in the gap by the material filling the cutouts 6, 16. The packings 13 which are disposed at both sides of each lattice girder 10 preferably form an integral unit which consists of foamed plastic material filling the entire space between the side walls 18, 18'. The width of the expansion joints 10, 13, 18, 18' in unstressed condition of the packings 13 exceeds the maximal width of the gap G, and the means for facilitating insertion of this joint into the gap of the road covering structure shown in FIG. 2 may again consist of spaced bolts 4 and nuts 14 which subject the joint to initial compression before the joint is inserted between the edge portions 5a, 15a and which are removed from the joint before the cutouts 6, 16 are filled with concrete or with another suitable filler substance.

An important advantage of grate bars which assume the form of lattice girders is that the expansion joint is much lighter and also that the packings 13 may form an integral unit which at least partially surrounds the lattice girders and which, therefore, is much less likely to become detached from the girders. Furthermore, the packings 13 form a corrosion-preventing protective coating about the girders.

Referring to FIG. 4, there is shown a different expansion joint whose side walls consist of U-bars 23, 23' and whose grate bars again assume the form of lattice girders 17 with the exception, however, that the upper chords 17a of such girders are located at a level below the upper sides of the pavement sections 5, 15. The lower chords 17b of the girders 17 are slidably supported by the friction reducing layer 9. In the embodiment of FIG. 4, edge portion 5a of the pavement section 5 need not be formed with a cutout so that its vertical face may move into full abutment with the outer side of the side wall 23. The other edge portion 15a is formed with a series of spaced cutouts 21 which may but need not extend all the way to the layer 9 and which accommodate certain parts adapted to facilitate introduction of the expansion joint into the gap G.

The expansion joint of FIG. 4 is assembled and anchored in the following manner: The machinery in which the plastic material of the packings 13 is poured into a form which contains the side walls 23, 23' and the lattice girders 17 is not shown. When the manufacture of this joint is completed, its overall width equals or is less than the width 19 of the space between the edge portions 5a, 15a. In other words, the joint may be received between the pavement sections 5, 15 without any initial compression. Each cutout 21 may receive a compressing device which includes a female member or bracket 20 abutting against the bottom wall of the respective cutout and a ram 20a whose threaded stem mates with threads in a bore of the bracket 20 and whose head may be moved into abutment with the outer side of the side wall 23'. By utilizing a suitable tool or machine, an operator may turn the stem of the ram 20a with respect to the bracket 20 so that the head of the ram causes the side wall 23' to move in a direction to the left, as viewed in FIG. 4, and to thereby compress the packings 13 so that a narrow space 22 develops between the vertical face of the edge portion 15a and the outer side of the side wall 23'. The space 22 is thereupon filled with concrete or with another suitable filler substance to insure that the packings 13 remain under permanent compression. In the final step, and after the material filling the space 22 was allowed to set, the operators remove the compressing devices 20, 20a from the cutouts 21, and the cutouts may be filled with concrete or the like all the way to the upper sides of the pavement sections 5, 15. The expansion joint is now anchored between the pavement sections and the upper flanges of the side walls 23, 23' overlap the adjacent portions of packings 13 to reduce the likelihood that moisture, dirt or other foreign matter could penetrate into the joint. The likelihood that such foreign matter could enter between the side walls 23, 23' and the adjacent packings is very remote since the packings are under permanent compression because the maximal width of the gap (i.e., the width of the space 22) is selected in such a way that it is always less than the width of the expansion joint in unstresssed condition of the packings 13. As shown in FIG. 4, the packings 13 may form an integral unit because the material of these packings may extend through the interstices of the lattice girders 17.

In the embodiment of FIG. 5, the edge portion 5a of the left-hand pavement section 5 is formed with a series of cutouts 6' (only one shown) each of which extends from the upper side of the section 5 and all the way to the friction reducing layer 9. The expansion joint comprises a series of spaced grate bars 1A each of which consists of a steel plate or strip which is located in a vertical plane and extends in the longitudinal direction of the gap G. The bars 1A are separated from each other by elastically compressible packings or cushions 24, 24' the former of which are adjacent to the upper portions of the respective grate bars and the latter of which are located close to the layer 9. Each group of packings is traversed by two or more spaced bolts 4 whose heads are received in suitable recesses machined in the vertical face of the edge portion 15a and whose threaded terminals extend into the respective cutouts 6'. Nuts 14 maintain the packings 24, 24' under compression and cooperate with the bolts 4 to reduce the width of the expansion joint to such an extent that the joint may be conveniently inserted into the gap G. Once the joint assumes the position of FIG. 5, the nuts 14 are removed from the cutouts 6' and the cutouts are filled with concrete. The bolts 4 remain in the joint and serve as a means for guiding the grate bars 1A when the joint expands or contracts in response to temperature changes. In addition, the bolts 4 prevent expulsion of the joint from the gap G, for example, in response to very large compression on a hot day when the material of the packings 24, 24' would be likely to allow buckling of the joint about one of the grate bars.

The expansion joint of FIG. 6 is very similar to the joint of FIG. 5, with the exception that the bolts 4 are replaced by slotted compressing rods or bolts 25 which extend transversely through the grate bars 1A and whose heads are adjacent to the outer side of the leftmost grate bar. The right-hand end portions of these compressing bolts are formed with vertical slots which may receive wedges 26 so that the wedges cause compression of packings 24, 24' by moving the rightmost grate bar 1A in a direction to the left, as viewed in FIG. 6. The edge portion 15a of the pavement section 15 is formed with a series of spaced cutouts 16' (only one shown in FIG. 6) which accommodate the wedges 26 during insertion of the expansion joint between the pavement sections 5, 15. When the joint is properly accommodated in the gap G, the wedges 26 are removed and the cutouts 16' are filled with concrete. The bolts 25 remain in the joint and perform the same function as the bolts 4 of the expansion joint shown in FIG. 5.

It will be readily understood that the bolts 26 may be replaced by rods each of which is provided with two slots, one at the outer side of the left-hand grate bar 1A and the other at the outer side of the right-hand grate bar. In such constructions, the edge portion 5a is also provided with cutouts (such as the cutouts 6' shown in FIG. 5), and each rod cooperates with two wedges 26 to subject the expansion joint to initial compression which is sufficient to reduce the width of the joint to less than the width of the gap G. This modification of my invention is so obvious that it can be readily comprehended without additional illustration.

Figure 7:
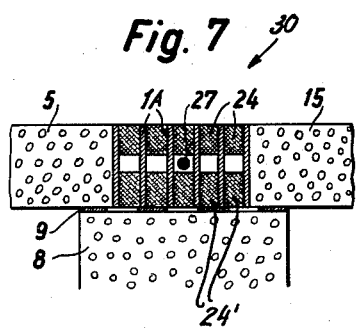
FIG. 7 is a longitudinal vertical section through two pavement sections and a transverse vertical section through a composite expansion joint which is provided with a device for maintaining its portions in end-to-end relation, the section of FIG. 7 being taken in the direction of arrows as seen from the line VII—VII of FIG. 8.
Figure 8:
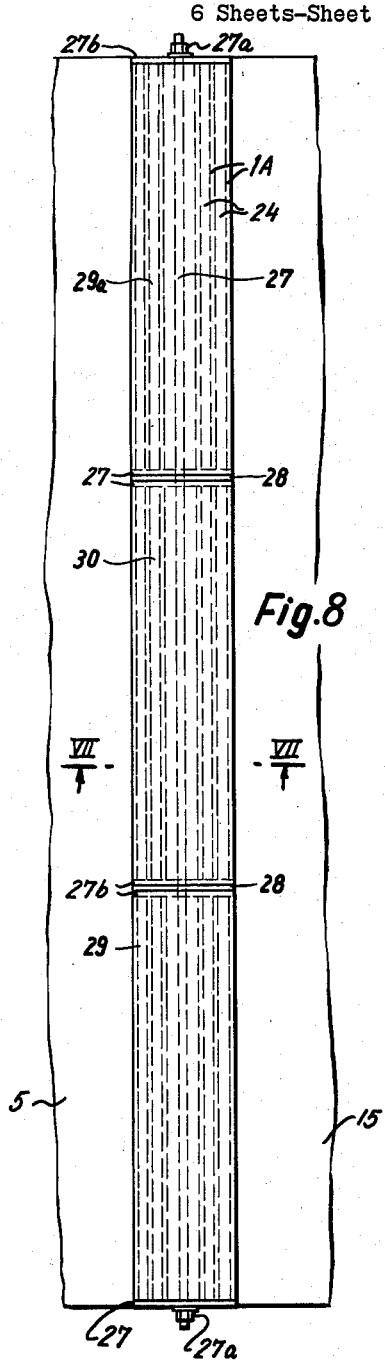
FIG. 8 is a top plan view of the structure shown in FIG. 7.

FIGS. 7 and 8 illustrate a composite expansion joint which comprises several end-to-end arranged portions including a median portion 30 and two outer portions 29, 29a. The construction of each of these portions is identical with the construction of the joint which is shown in FIG. 5 but the section of FIG. 7 is taken at a point between two adjacent pairs of bolts 4. The composite joint of FIGS. 7 and 8 comprises means for maintaining the portion 30 in end-to-end relation with the portions 29, 29a, and this means comprises an elongated rod 27 which is located between the median grate bars 1A and whose ends are provided with tensioning means 27a. The narrow spaces 28 between the ends of the portion 30 and the adjacent ends of the portions 29, 29a permit expansion of these portions in response to temperature changes. The ends of portions 29, 29a, 30 are bounded by transversely extending vertical end plates 27b.

Figure 9:
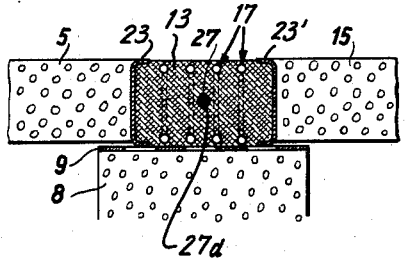
FIG. 9 is a section through a road covering structure embodying another composite expansion joint whose portions are constructed and assembled in a manner as shown in FIG. 4 and which comprises a modified device for maintaining its portions in end-to-end relation.

The expansion joint of FIG. 9 also comprises several portions which are arranged end-to-end in a manner as shown in FIG. 8. Each of these portions is identical with the expansion joint shown in FIG. 4. The means for maintaining the portions of the joint in end-to-end relation comprises a tubular guide 27d extending through that packing 13 which is located between the two median grate bars or lattice girders 17, and an elongated rod 27 whose end portions are provided with tensioning means in the same way as shown in FIG. 8.

The rod 27 may be replaced by cables or wires, particularly if the expansion joint comprises a tube such as the tube 27d of FIG. 9.

Referring to FIGS. 10 to 14, there is shown a different expansion joint which does not rest on a friction reducing layer such as the layer 9 of FIG. 1 but which is mounted in a pair of cutouts 6b, 16b respectively provided in the edge portions 5a, 15a of the pavement sections 5, 15. These sections further comprise spaced shoulder portions 5b, 15b which extend beneath the gap G, i.e., which form the lower walls of the cutouts 6b, 16b. Each cutout is surrounded by a metallic liner 31, and it will be noted that the upper flanges of these liners are recessed into the upper sides of the respective pavement sections.

The expansion joint of the road covering structure shown in FIG. 10 comprises a central spacer member 33 which assumes the shape of a hollow box and which extends in the longitudinal direction of the gap G, and two elastically deformable packages 32, 32' which are disposed at the opposite sides of the spacer member 33 and which abut against the respective liners 31. Each package comprises a series of spaced flat platelike grate bars 34 and tubular packings 35 which are interposed between the adjacent grate bars. As shown in FIG. 14, the packings 35 comprise outwardly extending ribs 35a which are received in complementary recesses provided in the vertical side faces of the grate bars 34 so that the grate bars are held against vertical displacements with respect to the packings. The packings are arranged in two vertically spaced rows and consist of rubbery plastic material which is maintained under compression when the expansion joint is received in the gap G. It is preferred to vulcanize the packings to the adjacent grate bars or to utilize a suitable adhesive in order to insure that each of the packages 32, 32' forms an integral unit.

When the width 37 of the gap G is somewhere between its minimal and maximal magnitudes, the width of a package 32 or 32' preferably equals or approximates the length of contact between the tire 36 of an automotive vehicle and the ground. The tire 36 is indicated in FIG. 10 by phantom lines, and it is assumed that this tire is mounted on a passenger car. The length of contact between the pavement surface and the tire of an automotive vehicle is normally 8 inches or thereabouts.

That portion of each liner 31 which is adjacent to the bottom zone of the respective cutout carries a series of pairwise arranged upwardly extending projections or rails 38, and such pairs are spaced from each other in the longitudinal direction of the gap G. These pairs of rails serve as a means for guiding transversely extending substantially flat plate-like supporting members 39 which are connected with the spacer member 33 by vertical bolts or rods 41. As shown in FIGS. 11 to 13, the rails 38 extend in the longitudinal direction of the gap G and are received between pairwise arranged transversely extending end walls 40 which are welded to the respective liners 31. Each supporting member 39 is reciprocable between two pairs of end walls 40 and slides along the upper sides of two rails 38. The upper end faces of the end walls 40 are flush with the upper side of the supporting member 39 (see FIG. 10) and serve as supports for the grate bars 34. Each liner 31 is preferably welded to the respective rails 38 and to the respective end walls 40 to form therewith a rigid structural unit.

Each bolt 41 is welded to the spacer member 33 and its lower end portion 41a pivotally supports a two-armed lever or beam 42 which is disposed in a horizontal plane beneath the respective supporting member 39 and whose bifurcated end portions receive motion transmitting pins 42a provided at the free ends of rigid extensions 43. One such extension 43 is provided at each transverse side of supporting member 39 and it will be noted that these extensions are respectively connected with the right-hand and left-hand liner 31, as viewed in FIGS. 11 to 13. In the illustrated embodiment, the extensions 43 are actually connected to the end walls 40. The parts 40, 41, 41a, 42, 42a and 43 together constitute a means for centering the spacer member 33 between the liners 31 and for thereby preventing excessive compression of the package 32 with resulting excessive expansion of the package 32', or vice versa.

FIG. 11 illustrates the centering means in a position its parts assume when the width of the gap G is reduced to a minimum, e.g., on a hot summer day when the packings 35 are subjected to maximum deformation because the liners 31 move into close proximity of each other. Since the extensions 43 are rigid with the respective liners, their pins 42a cause the beam 42 to pivot about the end portion 41a of the bolt 41 in a sense to maintain the spacer member 33 midway between the liners 31. If the width of the gap G there upon increases, the beam 42 is rocked in a clockwise direction, as viewed in FIG. 12, and the spacer member 33 remains equidistant from the liners 31. The situation is the same when the width of the gap G attains its maximal magnitude (FIG. 13), i.e., the beam 42 merely continues to pivot in a clockwise direction and, in cooperation with the extensions 43, insures that the spacer member 33 maintains the packages 32, 32' under identical compression. When the width of the gap G changes, the supporting member 39 slides on rails 38 and the undersides of the grate bars 34 slide along the upper faces of the end walls 40.

As stated hereinabove, the expansion joint of FIGS. 10 to 14 comprises several supporting members 39 and several centering means which are spaced from each other in the longitudinal direction of the gap G. Furthermore, it is assumed that each centering member 33 and each package of grate bars 34 and packings 35 consists of several portions which are arranged end-to-end in a manner as shown in FIG. 8. Each portion of the spacer member 33 is preferably mounted on at least two supporting members 39.

FIG. 14 shows that the right-hand liner 31 is connected with the rightmost grate bar 34 of the package 32' by a seam of weldant 44 which is formed at the upper right-hand corner of the package 32'. The seam 44 seals the clearance 45 between the left-hand face of the liner 31 and the right-hand side of the adjacent grate bar 34 and, if it should become necessary to remove the expansion joint from the gap G, it is rather simple to destroy the seam 44 by utilizing a rotary grinding disk or a similar device. Similar weldants connect the innermost grate bars of the packages 32, 32' with the member 33 and the leftmost grate bar of the package 32 with the left-hand liner 31.

The advantages of the spacer member 33 will be readily understood if one considers that the width 37 of the gap G shown in FIG. 10 may exceed 16 inches. Therefore, and when a vehicle travels along the pavement sections 5, 15, there is always an interval of time when the tires are supported solely by the expansion joint, i.e., when the tires do not rest simultaneously on one or both edge portions 5a, 15a and on the component parts of the expansion joint. Consequently, and if a driver applies the brakes at the exact time when the tires rest on the expansion joint, the tires are likely to transmit to grate bars 34 horizontal stresses which will tend to pivot or tilt these grate bars and to destroy the joint by causing separation of certain packings 35 from the adjacent grate bars. The spacer member 33 insures that the grate bars cannot be subjected to such excessive stresses because its distance from the edge portions 5a, 15a is preferably selected in such a way that a tire 36 will engage the spacer member and/or one of the edge portions 5a, 15a so that horizontal stresses developing during braking or acceleration of the vehicles cannot be transmitted solely to the grate bars 34. If the spacer member 33 were omitted, it could happen that the tires of automotive vehicles would actually separate certain packings 35 from the respective grate bars 34 so that dirt and moisture could penetrate into the gap, and it could further happen that one or more grate bars and/or one or more packings would be actually expelled from the gap.

The spacer member 33 should have at least two linear zones of contact with the innermost grate bars of the packages 32, 32', i.e., a first linear contact at a point close to the upper sides of the pavement sections 5, 15 and a second linear contact at a point closer to the shoulder portions 5b, 15b. Hollow box-shaped spacer members are preferred because they can resist horizontal, vertical as well as torsional stresses.

FIG. 15 illustrates a simplified construction of the means for supporting the spacer member 33 of FIG. 10. The beam 42 and the extensions 43 are omitted so that the supporting member 39 is guided only by rails 38 and by the end walls 40. The underside of this member 39 is provided with spaced downwardly extending stop lugs 56 which abut against the adjacent rails 38 when the supporting member is shifted too far from its central position. The structure of FIG. 15 may be utilized in comparatively narrow expansion joints or when the packages 32, 32' are maintained under rather high initial compression. The bolt 41 serves as a means for connecting the supporting member 39 with the spacer member 33. Slight displacements of the spacer member 33 in response to forces transmitted by the tires of vehicles passing over the road covering structure cannot damage the expansion joint which utilizes the structure of FIG. 15 because the packings 35 are bonded to the grate bars 34 and thus resist excessive expansion of the respective packages.

Referring to FIGS. 16 to 21, there is shown a different composite expansion joint which is inserted into a rather wide gap G. As shown in FIG. 16, the width 37' of the gap G equals the combined width of two spacer members 33, 33' and of three elastically compressible packages 32, 32', 32". The construction of each of these packages is identical with the construction of packages shown in FIGS. 10 and 14. The cutouts 6b', 16b' of the respective edge portions 5a, 15a receive metallic liners 31, and each of these liners carries a series of spaced rails 38 and a series of pairwise arranged end walls 40.

As shown in FIG. 21, each package of grate bars 34 and packings 35 comprises two or more end-to-end arranged portions which meet along the lines 46. The spacer members 33, 33' also consist of several end-to-end arranged portions 33a, 33b and 33a', 33b' which meet along the lines 48, and it will be noted that the portions of the packages 32, 32', 32" are staggered with respect to the portions of the spacer members 33, 33' in the longitudinal direction of the gap G. The advantage of such staggered mounting of the various portions is that stresses to which the portions of the packages are subjected at right angles to the longitudinal direction of the gap G are taken up by rigid spacer members.

The centering means of FIGS. 17 to 19 is located in that zone of the expansion joint (see FIG. 21) in which the end-to-end arranged portions of the packings and of the spacer members meet along the lines 46, 48, respectively. As shown in FIGS. 17 to 19, this centering means comprises two parallel rails 38 which are welded to the respective liners 31, two pairs of end walls 40 which are welded to the respective liners 31 and to the ends of the respective rails 38, two parallel supporting members 39, 39' the former of which is connected to the portions 33a, 33a' and 33b, 33b' of the spacer members 33, 33', the members 39, 39' being slidable on the rails 38 and between the end walls 40 in directions at right angles to the longitudinal extension of the gap G, and a beam 42b whose bifurcated ends receive motion transmitting pins 42a provided at the ends of two extensions 43 which are respectively rigid with the left-hand liner 31 and with the right-hand liner 31. The articulate connection 41b between the supporting member 39 and the beam 42b comprises a follower pin (e.g. a screw 47 shown in FIG. 16) which is secured to the member 39 and which extends into an elongated cam slot of the beam 42b. The connection between the beam 42b and the supporting member 39' is identical with the connection 41b. When the width of the gap G is reduced (FIG. 17), the beam 42b is inclined with respect to the longitudinal direction of the gap because it is rocked by the pins 42a in a sense to turn anticlockwise, as viewed in FIG. 17. When the width of the gap G increases (FIG. 18) the beam 42b is substantially parallel with the longitudinal direction of the spacer members 33, 33' and, when the width of the gap G continues to increase, the pins 42a rock the beam 42b in a clockwise direction, as viewed in FIG. 19 whereby the supporting members 39, 39' slide along the rails 38 and insure that the spacer members 33, 33' subject each of the packages 32, 32', 32" to identical expanding forces. The centering means of FIGS. 17–19 may be utilized with great advantage when the gap G is so wide that the expansion joint must comprise at least two but normally three or more spacer members.

FIG. 20 illustrates the manner in which the portions of the spacer members 33 may be welded to the supporting members 39, 39' by seams 49 to eliminate rattling of the spacer members. Members 33a and 33b e.g. being welded to member 39 and members 33a' and 33b' being welded to member 39'.

Referring again to FIG. 21, it will be noted that the portions 33b, 33b' of the spacer members 33, 33' may be supported by several intermediate supporting members 33A, 33B which are mounted on rails 38 and between end walls 40 in a manner as illustrated in FIG. 15, i.e., it is not necessary to provide means which would automatically center the supporting members 39A, 39B between the liners 31 because it is sufficient if centering means are provided in such zones of the expansion joint in which the end-to-end arranged portions of the spacer members and of the elastically compressible packages meet each other.

When the expansion joint comprises one or more spacer members (FIGS. 10 and 16), it is advisable to provide bolts 50 (see also FIG. 21) which extend at right angles to the longitudinal extension of the gap and which are slidably received in bores machined in the grate bars 34 and spacer members 33' and/or 33. As shown in FIG. 21, a pair of such guide bolts may be provided in rather close proximity of each other at a point near to the junctions 46, 48, and the joint may comprise one or more additional pairs of such bolts, especially if the joint is comparatively long. Bolts 50 prevent longitudinal displacements of the packages 32, 32', 32" with respect to the spacer members 33, 33' or vice versa, and these bolts also prevent the joint from being expelled from the gap G. Moreover, such bolts distribute the loads to which the joint is subjected by one or more vehicles to all of the grate bars 34 and to all of the end-to-end arranged portions of which the spacer members 33, 33' consist so that such loads may be taken up by the supporting members 39, 39' and are transmitted to the shoulder portions 5b, 15b. Still further, the bolts prevent rattling of grate bars and/or of the spacer members.

When the gap G is exceptionally wide so that the expansion joint must comprise two, three or more spacer members and a corresponding number of elastically deformable packages, it is advisable to stagger the portions of the spacer members and the portions of the packages in directions at right angles to the longitudinal extension of the gap. However, the friction between a hollow box-shaped spacer member and its supporting means is normally sufficient to prevent undesirable displacements of the spacer members along their supports.

FIG. 22 shows a further expansion joint which is similar to the joint of FIG. 10, with the exception that the bolts 50 are omitted because the configurations of the spacer member 53 and of the liners 51 are selected in such a way that the spacer member and the edge portions 5a, 15a define between themselves two elongated spaces 70, 71 whose width increases in a direction downwardly from the upper sides of the pavement sections 5, 15. The cross-section of the spacer member 53 resembles an inverted trapeze so that the outermost grate bars 34 of the packages 32, 32' are respectively wedged into the spaces 70, 71. Thus, once the packages 32, 32' are inserted into the gap G, they are retained in such position together with the spacer member 53 regardless of whether the width 37" of the gap changes in response to changes in temperature of the pavement sections 5, 15. The spacer member 53 is connected with its supporting member 39 by bolts and nuts 57 which eliminate noise.

The force with which the packings 35 press the outermost grate bars 34 against the spacer member 53 and against the liners 51 has a downwardly oriented component which maintains the packages 32, 32' in the respective spaces.

The expansion joint of FIG. 23 comprises a hollow box-shaped spacer member 33 and each of the liners 52 comprises a vertical web so that the width of the spaces 72, 73 between these liners and the vertical walls of the spacer member 33 is uniform throughout. The packages 32, 32' are wedged into the respective spaces 72, 73 by special inserts 55 which are welded to the innermost grate bars 34 and to the vertical walls of the spacer member 33. Similar inserts 55 are welded to the outermost grate bars 34 and to the liners 52 (see FIG. 24). The seams 54 are adjacent to the upper sides of the liners 52 to make sure that they may be destroyed by a grinding wheel or the like when it becomes necessary to remove the expansion joint from the gap G. The inserts 55 may assume the form of elongated profiled bars which extend along the full length of the gap G, and it is preferred to utilize rods of inverted trapeziform cross section.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and a substantially grate-like elastically compressible expansion joint received in said gap, said joint comprising a plurality of elongated grate bars extending in the longitudinal direction of said gap, elastically deformable packings received between said grate bars, and bolt means extending transversely of said gap and passing slidably through said grate bars and said packings, the width of said joint in undeformed condition of said packings exceeding the maximal width of said gap whereby the joint is permanently compressed between said edge portions, said bolt means permitting said grate bars to move away from each other under the bias of said packings when the width of said gap increases.

2. The combination as set forth in claim 1, wherein said grate bars are flat plates.

3. The combination as set forth in claim 1, wherein at least one of said grate bars is a lattice girder.

4. The combination as set forth in claim 1, wherein said bolt means are arranged to reduce the width of the joint to less than the width of the gap to facilitate insertion of the joint into the gap.

5. The combination as set forth in claim 1, wherein said bolt means comprises at least one bolt, and holding means arranged to be received on said bolt, said holding means being arranged to cooperate with said bolt to reduce the width of the joint to less than the width of the gap to facilitate insertion of the joint into the gap, said holding means being removable from said bolt after such insertion.

6. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and a substantially grate-like elastically compressible expansion joint received in said gap, said joint comprising at least one elongated spacer member extending in the longitudinal direction of said gap, supporting means disposed below and rigidly connected with said spacer member to hold said spacer member substantially centrally of said gap and against tilting with reference to said sections, said supporting means being movable with said spacer member relative to said sections in directions at right angles to the longitudinal direction of said gap, and an elastically deformable package disposed at each side of said spacer member, each of said packages comprising at least one grate bar extending in substantial parallelism with said spacer member and elastically deformable packings disposed at both sides of the respective bar, the width of said joint in undeformed condition of said packings exceeding the maximal width of said gap whereby the joint is permanently compressed between said edge portions.

7. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and a substantially grate-like elastically compressible expansion joint received in said gap, said joint comprising at least one elongated spacer member extending in the longitudinal direction of said gap, supporting means disposed below and rigidly connected with said spacer member to hold the spacer member substantially centrally of the gap and against tilting with reference to said sections, said supporting means being movable with said spacer member relative to said sections in directions at right angles to the longitudinal direction of said gap, and an elastically deformable package disposed at each side of said spacer member, each of said packages comprising at least one grate bar extending in substantial parallelism with said spacer member and elastically deformable packings disposed at both sides of the respective bar, the width of said joint in undeformed condition of said packings exceeding the maximal width of said gap whereby the joint is permanently compressed between said edge portions and the maximal width of each of said packages approximating the length of area of contact between a road surface and the wheel of an automotive vehicle.

8. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and a substantially grate-like elastically compressible expansion joint received in said gap, said joint comprising at least one elongated hollow box-like spacer member extending in the longitudinal direction of said gap, supporting means disposed below and rigidly connected with said spacer member to hold the spacer member substantially centrally of said gap and against tilting with reference to said sections, said supporting means being movable with said spacer member relative to said sections in directions at right angles to the longitudinal direction of said gap, and an elastically deformable package disposed at each side of said spacer member, each of said packages comprising at least one grate bar extending in substantial parallelism with said spacer member and elastically deformable packings disposed at both sides of the respective bar, the width of said joint in undeformed condition of said packings exceeding the maximal width of said gap whereby the joint is permanently compressed between said edge portions.

9. In a road covering structure, in combination, a first pavement section and a second pavement section, said sections having upper sides and adjacent edge portions defining between themselves an elongated gap extending downwardly from said upper sides, at least one of said sections being movable with respect to the other section so as to change the width of said gap between a minimal and a maximal magnitude; and a substantially grate-like elastically compressible expansion joint received in said gap, said joint comprising at least one elongated spacer member extending in the longitudinal direction of said gap, said spacer member defining with said edge portions a pair of elongated spaces and said spacer member and said edge portions having surfaces adjacent to said spacer and inclined with reference to each other in such a way that the width of said spaces increases in a direction downwardly from the upper sides of the respective pavement sections, supporting means disposed below and rigidly connected with said spacer member to hold the spacer member substantially centrally of said gap and against tilting with reference to said sections, said supporting means being movable with said spacer member relative to said sections in directions at right angles to the longitudinal direction of said gap, and an elastically deformable package received in each of said spaces, each of said packages comprising at least one grate bar extending in substantial parallelism with said spacer member and elastically deformable packings disposed at both sides of the respective bar, the width of said joint in undeformed condition of said packings exceeding the maximal width of said gap whereby said packages are wedged in the respective spaces and the joint is permanently compressed between said edge portions.

10. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude, said sections further comprising spaced shoulder portions extending toward each other beneath said gap; and a substantially grate-like elastically compressible expansion joint received in said gap, said joint comprising at least one elongated spacer member extending in the longitudinal direction of said gap, supporting means disposed below and rigidly connected with said spacer member to hold the spacer member substantially centrally of said gap and against tilting with reference to said sections, guide means for said supporting means, said guide means being provided on said shoulder portions and being arranged to guide said supporting means and said spacer member relative to said sections for movement in directions at right angles to the longitudinal direction of said gap, and an elastically deformable package disposed at each side of said spacer member, each of said packages comprising at least one grate bar extending in substantial parallelism with said spacer member and elastically deformable packings disposed at both sides of the respective bar, the width of said joint in undeformed condition of said packings exceeding the maximal width of said gap whereby the joint is permanently compressed between said edge portions.

11. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and a substantially grate-like elastically compressible expansion joint received in said gap, said joint comprising at least one elongated spacer member extending in the longitudinal direction of said gap, said spacer member comprising a plurality of end-to-end arranged portions, supporting means disposed below and rigidly connected with said spacer member to hold the spacer member substantially centrally of said gap and against tilting with reference to said sections, said supporting means being movable with said spacer member relative to said sections in directions at right angles to the longitudinal direction of said gap, and an elastically deformable package disposed at each side of said spacer member, each of said packages comprising a plurality of end-to-end arranged portions and each of said portions comprising at least one grate bar extending in substantial parallelism with said spacer member and elastically deformable packings disposed at both sides of the respective bar, the width of said joint in undeformed condition of said packings exceeding the maximal width of said gap whereby the joint is permanently compressed between said edge portions, the portions of said packages being staggered with respect to the portions of said spacer member in the longitudinal direction of said gap.

12. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and a substantially grate-like elastically compressible expansion joint received in said gap, said joint comprising two spaced elongated spacer members extending in the longitudinal direction of said gap, supporting means comprising pairs of supporting members disposed below said spacer members, one of each pair of supporting members being connected to one of said spacer members and the other of each pair of supporting members being connected with the other spacer member, said supporting members being rigid with and being movable with the respective spacer members in directions at right angles to the longitudinal direction of said gap, a first elastically deformable package disposed between said spacer members, a second elastically deformable package disposed between one of said spacer members and one of said edge portions, and a third elastically deformable package disposed between the other spacer member and the other edge portion, each of said packages comprising at least one grate bar extending in substantial parallelism with said spacer members and elastically deformable packings disposed at both sides of the respective bar, the width of said joint in undeformed condition of said packings exceeding the maximal width of said gap whereby the joint is pedmanently compressed between said edge portions.

13. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and an elastically compressible expansion joint received in said gap, said joint comprising a plurality of end-to-end arranged portions and each of said last mentioned portions comprising at least one grate bar extending in the longitudinal direction of said gap, and elastically deformable packings disposed at both sides of said bar, the width of said joint in undeformed condition of said packings exceeding the maximal width of said gap whereby the joint is permanently compressed between said edge portions, and means for maintaining the portions of said joint in end-to-end relation.

14. A combination as set forth in claim 13, wherein the means for maintaining the portions of said joint in end-to-end relation comprises tubular guide means extending in the longitudinal direction of said gap and disposed between said packings, elongated rod means extending through said tubular means, and tensioning means provided on said rod means at each longitudinal end of said joint.

15. A combination as set forth in claim 14, wherein each portion of said joint includes a plurality of spaced grate bars including a pair of median grate bars and wherein said tubular guide means is located between said median grate bars.

16. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude; and a substantially grate-like elastically compressible expansion joint received in said gap, said joint comprising at least one elongated spacer member extending in the longitudinal direction of said gap, supporting means comprising pairs of closely adjacent supporting members disposed below and rigidly connected with said spacer member to hold the spacer member substantially centrally of said gap and against tilting with reference to said sections, said supporting members being movable with said spacer member relative to said sections in directions at right angles to the longitudinal direction of said gap, and an elastically deformable package disposed at each side of said spacer member, each of said packages comprising at least one grate bar extending in substantial parallelism with said spacer member and elastically deformable packings disposed at both sides of the respective bar, the width of said joint in undeformed condition of said packings exceeding the maximal width of said gap whereby the joint is permanently compressed between said edge portions.

17. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude, said sections further comprising spaced shoulder portions extending toward each other beneath said gap; and a substantially grate-like elastically compressible expansion joint received in said gap, said joint comprising at least one elongated spacer member extending in the longitudinal direction of said gap, supporting means disposed below and rigidly connected with said spacer member to hold the spacer member substantially centrally of said gap and against tilting with reference to said sections, guide means mounted on said shoulder portions for guiding said supporting means so that the latter is movable relative to said sections at right angles to the longitudinal direction of said gap, an elastically deformable package disposed at each side of said spacer member; each of said packages comprising at least one grate bar extending in the longitudinal direction of said gap and elastically deformable packings disposed at both sides of the respective grate bar, the width of said joint in undeformed condition of said packings exceeding the maximal width of said gap whereby the joint is permanently compressed between said edge portions, and elongated guide bolt means slidably extending through said spacer member and through said grate bars for guiding said grate bars when the joint expands or contracts in response to changes in the width of said gap, said bolt means making right angles with the longitudinal extension of said gap.

18. In a road covering structure, in combination, a first pavement section and a second pavement section, said sections having adjacent edge portions defining between themselves an elongated gap and at least one of said sections being movable with respect to the other section so as to change the width of said gap between a minimal and a maximal magnitude, said sections further comprising spaced shoulder portions extending toward each other beneath said gap; and a substantially grate-like elastically compressible expansion joint received in said gap, said joint comprising at least one elongated spacer member extending in the longitudinal direction of said gap, supporting means disposed below and rigidly connected with said spacer member to hold the spacer member substantially centrally of said gap and against tilting with reference to said sections, guide means mounted on said shoulder portions for guiding said supporting means so that the latter is movable relative to said sections at right angles to the longitudinal direction of said gap, an elastically deformable package disposed at each side of said spacer member, each of said packages comprising at least one grate bar extending in the longitudinal direction of said gap and elastically deformable packings disposed at both sides of the respective grate bar, the width of said joint in undeformed condition of said packings exceeding the maximal width of said gap whereby the joint is permanently compressed between said edge portions, and centering means for said spacer member, said centering means comprising a two-armed beam rockably connected with said supporting means and a pair of extensions each rigidly fixed to one of said edge portions and to one arm of said beam to rock the beam and to thereby displace said supporting means with said spacer member when the distance between said edge portions changes.

19. A combination as set forth in claim 18, wherein said supporting means comprises a substantially flat plate-like member having a central portion pivotally connected with said beam so that the beam is rockable about a vertical axis, said guide means for said plate-like member comprising a pair of rails each mounted on one of said shoulder portions and supportingly engaging the underside of said plate-like member, and end walls secured to said shoulder portions for limiting movements of said plate-like member in the longitudinal direction of said gap.

20. In a road covering structure, in combination, a first pavement section and a second pavement section, said sections having upper sides and adjacent edge portions defining between themselves an elongated gap and at least one of said sections being movable with respect to the other section so as to change the width of said gap between a minimal and a maximal magnitude, said sections further comprising spaced shoulder portions extending toward each other beneath said gap; and a substantially grate-like elastically compressible expansion joint received in said gap, said joint comprising at least one elongated spacer member extending in the longitudinal direction of said gap, supporting means disposed below and rigidly connected with said spacer member to hold the spacer member substantially centrally of said gap and against tilting with reference to said sections, guide means mounted on said shoulder portions for guiding said supporting means so that the latter is movable relative to said sections at right angles to the longitudinal direction of said gap, an elastically deformable package disposed at each side of said spacer member, each of said packages comprising at least one grate bar extending in the longitudinal direction of said gap and elastically deformable packings disposed at both sides of the respective grate bar, the width of said joint in undeformed condition of said packings exceeding the maximal width of said gap whereby the joint is permanently compressed between said edge portions, and wedge-like inserts provided between said packages and the respective edge portions, said insert adjacent to the upper sides of the respective pavement sections for compressing the packings and for thereby wedging said packages between said spacer member and the respective edge portions.

21. A combination as set forth in claim 20, further comprising additional inserts provided between said spacer member and said packages, said additional inserts being located in close proximity of the upper sides of said pavement sections.

References Cited by the Examiner

UNITED STATES PATENTS

| 1,236,972 | 8/1917 | Obenauer | 94—51 |
| 1,885,391 | 11/1932 | Thompson | 94—18.2 |
| 1,960,374 | 5/1934 | Edmonds | 94—18.2 |
| 2,240,787 | 5/1941 | Kinzer | 94—18.2 |
| 2,276,542 | 3/1942 | Kovanda | 94—51 |
| 2,967,467 | 1/1961 | Maude | 94—51 X |
| 3,055,279 | 9/1962 | Rinker | 94—18.2 |
| 3,073,065 | 1/1963 | Alderman | 50—80 |
| 3,094,907 | 6/1963 | Hirst | 94—4 |
| 3,113,493 | 12/1963 | Rinker | 94—18 |
| 3,165,986 | 1/1965 | Hirst | 94—18 |
| 3,165,987 | 1/1965 | Hirst | 94—18 |

CHARLES E. O'CONNELL, *Primary Examiner.*

JACOB L. NACKENOFF, *Examiner.*

N. C. BYERS, *Assistant Examiner.*